3,246,131
COMPUTER DATA COLLECTION SYSTEM
Paul U. Webb and Edwin K. Clardy, both of Bartlesville, Okla., assignors to Phillips Petroleum Company, a corporation of Delaware
Filed Dec. 26, 1961, Ser. No. 162,110
3 Claims. (Cl. 340—347)

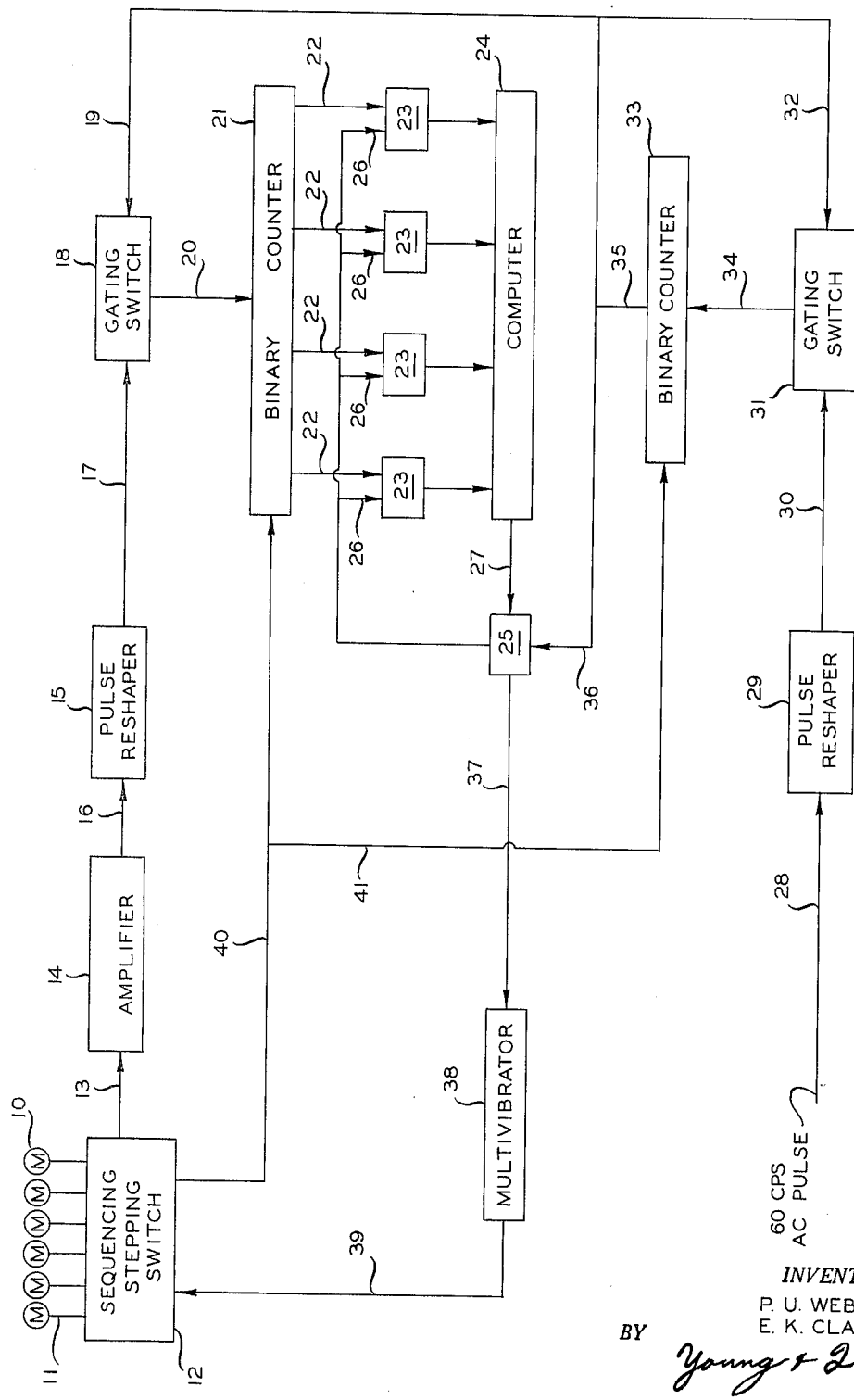

This invention relates to an improved computer data collection system. In a specific aspect, this invention relates to an improved digital computer data collection system wherein the data transferred to said collection system is in the form of an alternating current signal. In another specific aspect, this invention relates to an improved digital computer data collection system wherein a rate of fluid flow is transferred to a digital computer.

Turbine-type flow meters such as manufactured by Potter Aeronautical Company, Union, New Jersey, are employed to measure a volume of fluid flow. The turbine-type flow meter transmits an output signal in the form of an alternating current signal. The frequency of the signal increases in direct proportion to the volume of flow through the meter. When employing the turbine-flow meter to determine the rate of fluid flow the output signal frequency of the turbine-flow meter must be accurately determined and converted to digital form prior to transference to a digital computer.

We have discovered a method of and apparatus for counting the frequency of an alternating current signal. We have further discovered a method of and apparatus for converting alternating current signals, wherein the frequency of each of said signals is representative of a measured process variable, to digital form, determining the frequency of each of said signals and transferring the resulting process data in digital form to a digital computer. We have also discovered an accurate method of and apparatus for measuring a rate of fluid flow.

Accordingly, an object of this invention is to provide a method of and apparatus for counting the frequency of an alternating current.

Another object of this invention is to provide an improved method of and apparatus for measuring a rate of fluid flow.

Another object of this invention is to provide a method of and apparatus for transferring data to a digital computer.

Another object of this invention is to provide a method of and apparatus for determining the frequency of an alternating current signal, said frequency representative of a measured process variable, and converting the resulting data so as to provide signals in the form of "words" comprising digital bits which are then transferred to a digital computer.

Another object of this invention is to provide a method of and apparatus for converting the volume flow measurements of a turbine-flow meter so as to provide rate of flow signals in the form of "words" comprising digital bits which are fed into a digital computer.

Other objects, advantages and features of our invention will be readily apparent to those skilled in the art from the following description and the appended claims.

The drawing is a schematic diagram of the inventive digital computer collection system.

Referring to the drawing, there is illustrated a series of turbine-flow meters 10, such as manufactured by Potter Aeronautical Company, Union, New Jersey, and illustrated in Bulletin No. 10M-5-59. The output alternating current signals from turbine-flow meters 10, each of said signals representative of a volume of fluid flow, are applied through respective channel means 11 to a conventional sequencing stepping switch 12, said stepping switch 12 comprises a plurality of cooperating stepping switch levels. Stepping switch 12 receives all of the signals at ats input terminal and takes them one at a time, obtains the value of each one seriatim, and then applies each signal so treated to appropriate means, hereinafter described, for further processing towards conversion to the digital word representing the value of the signal. Details of sequencing stepping switches can be obtained by referring to copending application Serial No. 66,119 filed October 31, 1960, by A. J. Andrews.

The individual output signals of the turbine-flow meters are selected one at a time by sequencing stepping switch 12 and applied to a conventional differential amplifier 14 through a channel means 13. A suitable amplifier is described by the operating and maintenance instructions for Model 114A D.C. Differential Amplifier, code No. 2PX-44. This amplifier is manufactured by KINTEL, a division of COHU Electronic, Inc., 5725 Kearny Villa Road, San Diego 12, California.

An output signal is transmitted from amplifier 14 through channel means 16 to a means 15 of reshaping the alternating current signals transmitted by turbine-flow meters 10. An instrument capable of reshaping the alternating current signals is known as the ST1 Dual Schmitt Trigger, distributed by Packard Bell Computer Corporation, Los Angeles 25, California, and illustrated in catalog SP-120. The Schmitt Trigger changes the shape of the signal to a square wave signal, said square wave signal of the digital form desired for triggering succeeding circuitry.

The reshaped pulses are transmitted to a gating switch 18 via channel means 17. Gating switch 18 transmits the reshaped pulses received via channel means 17 to a binary counter 21 via channel means 20. Gating switch 18 continues to transmit pulses to binary counter 21, as received via channel means 17, until an inhibit signal is transmitted to gating switch 18 via channel means 19. The source of the inhibit signal will hereinafter be described. A suitable gating switch is the NEI Dual NOR element manufactured by Packard Bell Computer Corporation, Los Angeles 25, California, and illustrated in catalog SP-120. Gating switch 18 will thus transmit those pulses received via channel means 17 only so long as an inhibit signal is not being received via channel means 19.

In the illustrated embodiment, a 16 bit binary counter 21 is employed to count and store the pulses received from gating switch 18 via channel means 20. Although a binary counter is herein employed, it is within the scope of this invention to utilize other means of storing, counting and transmitting signals representative of the number of pulses received. For example, it is within the scope of this invention to transmit signals, representative of the number of pulses received, in decimal form to a digital computer.

When the counting of pulses has been terminated, the binary counter transmits signals to the input register of a digital computer 24, the transmission of said signals controlled by gates 23. Gates 23 transmit the signals received from binary counter 21 to computer 24 upon receiving a "read" signal transmitted to gate 23 via conduit means 26. The "read" signal via conduit means 26 is present only when a signal via channel means 36 and a "read" signal via channel means 27 is transmitted to the And gate 25. As long as the "read" signal is applied to gates 23, gates 23 will continue to transmit the signals from binary counter 21 to computer 24. A suitable gate, conventionally known as an And gate, is manufactured as DG3 Diode Gate Module by Packard Bell Computer Corporation, Los Angeles 25, California, and illustrated in catalog SP–120.

A 60-cycle per second alternating current pulse is passed via channel means 28 to a means 29 of reshaping said pulse to provide a square pulse. As previously noted, a conventional means of reshaping the pulse comprises the utilization of a Schmitt Trigger. The reshaped pulse is transmitted via channel means 30 through a conventional gating switch 31. As previously noted, a suitable gating switch is the NEI Dual NOR Module manufactured by Packard Bell Computer Corporation, Los Angeles 25, California. Gating switch 31 transmits the reshaped pulses as received via channel means 30 to binary counter 33 via channel means 34 until an inhibit signal is transmitted to gating switch 31 via channel means 32. So long as the inhibit signal is transmitted to gating switch 31, the transmission of pulses to binary counter 33 is interrupted.

Binary counter 33 is a conventional 12 bit binary counter capable of receiving, counting and storing the reshaped pulses received via channel means 34. A suitable 12 bit and 16 bit binary counter can be constructed from BC1 Binary Counter Modules manufactured by Packard Bell Computer Corporation, Los Angeles 25, California. Upon receiving 3600 pulses, representative of the passage of one minute of time, an inhibit signal is transmitted via channel means 35 and channel means 19 from binary counter 33 to gating switch 18. In this manner, pulses received by gating switch 18 during the one minute of time that binary counter is receiving 3600 pulses are transmitted via channel means 20 to binary counter 21.

Upon receiving 3600 pulses binary counter 33 also transmits an inhibit signal via channel means 35 and channel means 32 to gating switch 31, thereby preventing the continuance of the flow of pulses to binary counter 33 via channel means 34. The inhibit signal is also transmitted from binary counter 33 via channel means 35 and channel means 36 to a gate means 25. Gate means 25, as in the case of gate means 23, is capable of transmitting a signal to a multivibrator 38 via channel means 37 upon receiving simultaneous signals from computer 24 ("read" signal) and binary counter 33.

A one-shot multivibrator 38 provides a means of causing sequencing stepping switch 12 to advance one position by transmitting a signal via channel means 39 to sequencing stepping switch 12, said multivibrator 38 transmitting the signal via channel means 39 upon receiving a signal via channel means 37, and after delaying at least the time required to permit binary counter 21 to transmit the stored signals to computer 24. This delay is normally in the range of milliseconds. Upon receipt of the signal transmitted via channel means 39, stepping switch 12 advances one position and transmits a reset signal via channel means 40 to binary counter 21 and via channel means 40 and 41 to binary counter 33. This resetting removes the inhibit signal and pulses from the next flow meter are immediately gated in for counting. A suitable multivibrator is the TO3 Dual One-Shot Multivibrator manufactured by Packard Bell Computer Corporation, Los Angeles 25, California, and illustrated in catalog SP–120.

Although the inventive data collection system has been described as particularly applied to turbine-flow meters, it is not intended to limit it thereto. The inventive data collection system is applicable to the collection, counting, determination of the rate of receipt and transmission of alternating signals representative of process data to a digital computer.

As will be evident to those skilled in the art, various modifications of this invention can be made, or followed, in the light of the foregoing disclosure and discussion without departing from the spirit or scope thereof.

We claim:

1. Apparatus comprising, in combination, first means for converting a first alternating current signal representative of a measurable quantity into the proper digital form, first means for counting the frequency of a first converted signal, first gate means of passing said first converted signal from said first means for converting to said first means for counting the frequency of said first converted signal, second means for converting a second alternating current signal having a constant frequency into the proper digital form, second means for counting the frequency of a second converted signal of constant frequency, second gate means of passing said converted signal of constant frequency from said second means for converting to said second means for counting simultaneously with the passage of said first converted signal through said first gate means, means of passing a first inhibit signal from said second means for counting to said first and second gate means, a third gate means, means of passing a first read signal from said second means for counting to said third gate means, a digital computing means, means for passing a second read signal from said computing means to said third gate means, a fourth gate means, means for passing a third read signal from said third gate means to said fourth gate means, means of passing a signal representative of the number of frequencies counted from said first means for counting to said fourth gate means, means for passing said signal representative of the number of frequencies counted from said fourth gate means to said computing means, means for passing in sequence to said first means for converting a plurality of alternating current signals representative of a plurality of measurable quantities, means for passing an advance signal from said third gate means to said means for passing in sequence to said first means for converting a plurality of alternating current signals representative of a plurality of measurable quantities, and means for passing a reset signal from said sequencing means to said first and second means for counting.

2. The apparatus of claim 2 to include means for amplifying each of said plurality of alternating current signals.

3. Apparatus comprising, in combination, first means for converting a first alternating current signal representative of a measurable quantity into the proper digital form, first means for counting the frequency of a resultant first converted signal, first gate means for passing said first resultant converted signal from said first means for converting to said first means for counting, second means for converting a second alternating current signal having a constant frequency into the proper digital form, second means for counting the frequency of a second resultant converted signal of constant frequency, second gate means for passing said converted signal of constant frequency from said second means for converting to said second means for counting simultaneously with the passage of said first resultant converted signal to said first gate means, means for passing a first inhibit signal from said second means for counting to said first and second gate means, a third gate means, means for passing a first read signal from said second means for counting to said third gate means, a digital computing means, means for passing a second read signal from said computing means to said third gate means, a fourth gate means, means for passing a third read signal from said third gate means to said fourth gate means, means for passing a signal representative of the number of frequencies counted from said first means for counting to said fourth gate means, and means for passing said signal representative of the number of frequencies counted from said fourth gate means to said computing means.

References Cited by the Examiner
UNITED STATES PATENTS

| | | | |
|---|---|---|---|
| 2,504,999 | 4/1950 | McWhirter et al. | 340—183 |
| 2,554,886 | 5/1951 | Stedman et al. | 340—183 |
| 2,617,931 | 11/1952 | Trovsdale | 235—92 |
| 2,901,607 | 8/1959 | Stoddard | 235—92 |
| 2,925,555 | 2/1960 | Gordon | 340—347 |
| 2,986,699 | 5/1961 | McHenry | 324—78 |
| 2,987,674 | 6/1961 | Shain | 324—78 |
| 2,992,384 | 7/1961 | Malbrain | 324—78 |
| 2,998,186 | 8/1961 | Meyer | 235—150 |
| 3,020,749 | 2/1962 | Cropper et al. | 324—78 |
| 3,034,101 | 5/1962 | Loewe | 340—172.5 |
| 3,119,995 | 1/1964 | Burk et al. | 340—347 |
| 3,135,954 | 6/1964 | Francisco | 340—347 |
| 3,144,802 | 8/1964 | Faber et al. | 324—78 |

MALCOLM A. MORRISON, *Primary Examiner.*

WALTER W. BURNS, JR., *Examiner.*